United States Patent [19]

Ozaki

[11] Patent Number: 5,345,438
[45] Date of Patent: Sep. 6, 1994

[54] TRANSMISSION DEVICE CAPABLE OF READILY CONTROLLING ACTIVE AND BACKUP SECTIONS

[75] Inventor: Hirokazu Ozaki, Tokyo, Japan
[73] Assignee: NEC Corporation, Japan
[21] Appl. No.: 934,018
[22] Filed: Aug. 21, 1992
[30] Foreign Application Priority Data
  Aug. 22, 1991 [JP] Japan .................. 3-211174
[51] Int. Cl.5 ............................................. H04J 1/16
[52] U.S. Cl. ...................................... 370/16; 370/13;
  371/8.1; 340/825.01
[58] Field of Search ....................... 370/13, 14, 15, 16;
  371/8.1, 8.2; 340/825.01; 455/8, 103, 105

[56] References Cited
U.S. PATENT DOCUMENTS

| | | | |
|---|---|---|---|
| 4,232,206 | 11/1980 | Tooyama | 371/8.2 |
| 4,700,348 | 10/1987 | Ise et al. | 340/825.1 |
| 4,763,316 | 8/1988 | Schaich et al. | 370/16 |
| 4,847,837 | 7/1989 | Morales et al. | 370/16 |
| 5,146,474 | 9/1992 | Nagler et al. | 370/16 |

*Primary Examiner*—Douglas W. Olms
*Assistant Examiner*—Chau T. Nguyen
*Attorney, Agent, or Firm*—Ostrolenk, Faber, Gerb & Soffen

[57] ABSTRACT

In a transmission device which includes first and second sections each of which has a first package stage and a second package stage connected to the first package stage through a back board, the first package stages in the first and the second sections are connected to input lines given the same input signals, respectively. The first and the second sections are selectively operable as an active and a backup section and comprise fault detectors, signal distributors, and switch circuits connected to the signal distributors in the first package stages, respectively. Each of the switch circuits has a plurality of outgoing internal lines each of which is connected in common to a selected one of the outgoing internal lines of another switch circuit on the back board to be connected to one of the second package stages. A switch controller monitors only the fault detectors of the first package stages in the first and the second sections to detect a fault. On detection of the fault of the active section, the switch circuits are controlled by the switch controller to switch the active and the backup sections from one to another and to recover the fault by the backup section. A pair of the transmission devices may be connected to preceding stages of high speed packages which are divided into active and backup high speed packages.

3 Claims, 4 Drawing Sheets

TRANSMISSION DEVICE CAPABLE OF READILY CONTROLLING ACTIVE AND BACKUP SECTIONS

BACKGROUND OF THE INVENTION

This invention relates to a transmission device for use in switching from an active section to a backup section in a digital communication system. It is to be noted that the transmission device may be supplied either with a plurality of multiplexed signals or with a plurality of nonmultiplexed signals, although each of the multiplexed and the nonmultiplexed signals will be collectively called an input signal.

A conventional transmission device of the type described often comprises not only an active section but also a backup section so as to improve reliability of the transmission device.

For example, such a transmission device may be located between a plurality of high speed transmission lines and a plurality of low speed transmission lines. In this event, the high speed transmission lines are divided into a single backup high speed transmission line and active high speed transmission lines, N in number, while the low speed transmission lines are divided into a single active low speed transmission line and a corresponding low speed backup line. Thus, this structure has a high speed side of a 1:N scheme and a low speed side of a 1:1 scheme or a one-plus-one (1+1) scheme.

Alternatively, another conventional transmission device may comprise a duplex structure which is composed of an active section and a backup section. Both the active and the backup sections of the duplex structure may be located between a plurality of input external transmission lines and a plurality of output external transmission lines connected to any other external devices or may be located within an exchange or the like to connect internal input lines to internal output lines.

At any rate, both the active and the backup sections are similar in structure to each other in each of the conventional transmission devices. More specifically, each of the active and the active and the backup sections comprises a signal distributor package and a signal switching package both of which are connected to each other through electric wirings laid on a back board and which may be referred to as first and second packages, respectively. Each signal distributor package comprises a fault detection circuit connected to a selected one of input lines and a signal distributor connected to a plurality of the signal switching packages arranged in the active and the backup sections. This shows that each of the signal distributor packages is crosswise connected to the following signal switching packages on the back board outside of the signal distributor packages and the signal switching packages.

In this structure, each of the signal distributor packages is given an input signal to distribute the input signal to a plurality of distributor output terminals and to produce a plurality of internal output signals in parallel through the distributor output terminals. The internal output signals are delivered to each of the signal switching packages from different ones of the signal distributors. Each of the signal switching packages comprises a switch circuit which selects one of the internal output signals to produce the selected internal output signal as an external output signal. Thus, a plurality of the internal output signals are delivered to each switch circuit of the signal switching packages.

Accordingly, a plurality of input terminals should be provided in each of the signal switching packages so as to receive the plurality of the internal output signals from the plurality of the signal distributor packages.

Herein, it is to be noted that fault detection should be made at every one of the internal output signals given to each switch circuit. This means that a plurality of fault detectors should be included in each of the signal switching packages to detect a fault in each of the internal output signals and should be monitored by a control circuit which carries out switch control operation of the switch circuits included in the signal switching packages.

Under the circumstances, if a fault takes place in the active section, the switch circuits are operated in the plurality of the signal switching packages under control of the control circuit to switch from the active section to the backup section. Thereafter, communication is carried out through the backup section which recovers the fault in the active section. From this fact, it is readily understood that the control circuit should monitor not only the fault detection circuits included in the signal distributor packages but also the fault detection circuits included in the signal switching packages.

In the above-mentioned transmission device, complexed wirings are required on the back board to connect each of the signal distributor packages to the following signal switching packages through the input terminals of the signal switching packages. This makes the wirings difficult on the back board. In addition, a large number of the fault detection circuits should be prepared in the signal distributor packages and the signal switching packages. This makes the distributor packages and the control circuit intricate in structure. In addition, the control circuit should execute an intricate control operation.

SUMMARY OF THE INVENTION

It is an object of this invention to provide a transmission device which can facilitate control operation.

It is another object of this invention to provide a transmission device of the type described, which is capable of simplifying wirings on a back board connected to two adjacent packages.

It is still another object of this invention to provide a transmission device of the type described, which can reduce fault detection circuits in number.

It is yet another object of this invention to provide a transmission device of the type described, which is capable of simply and quickly switching from an active section to a backup section.

A transmission device to which this invention is applicable is located between a plurality of input lines for input signals and first and second output lines for output signals. The transmission device comprises first and second sections which are selectively operable as an active section and a backup section. The first section comprises a first primary package stage connected to a first one of the input lines and a second primary package stage connected to the first output line while the second section comprises a first subsidiary package stage connected to a second one of the input lines and a second subsidiary package stage connected to the second output line. According to this invention, the first primary package stage comprises a primary signal distributing circuit connected to the first one of the input lines for distributing a first one of the input signals to produce a plurality of primary input signals each of which is identical with the first one of the input signals, and a first switch circuit which has a plurality of primary switch input terminals and a plurality of primary switch output terminals and which is supplied through the plurality of the primary switch input terminals with the primary input signals for selectively sending the primary input signals to the plurality of the primary switch output terminals. Likewise, the first subsidiary package stage comprises a subsidiary signal distributing circuit connected to the second one of the input lines for distributing a second one of the input signals to produce a plurality of subsidiary input signals each of which is identical with the second one of the input signals and a second switch circuit which has a plurality of subsidiary switch input terminals and a plurality of subsidiary switch output terminals and which is supplied through the plurality of the subsidiary switch input terminals with the subsidiary input signals for selectively sending the subsidiary input signals to the plurality of the subsidiary switch output terminals. The transmission device further comprises connection means between the first primary and the first subsidiary package stages and the second primary and the second subsidiary package stages for connecting a selected one of the primary switch output terminals and a selected one of the subsidiary switch output terminals in common to a selected one of the second primary and the second subsidiary package stages and for connecting a remaining one of the primary switch output terminals and a remaining one of the subsidiary switch output terminals in common to a remaining one of the second primary and the second subsidiary package stages.

DESCRIPTION OF THE PREFERRED EMBODIMENTS

Figure 1:
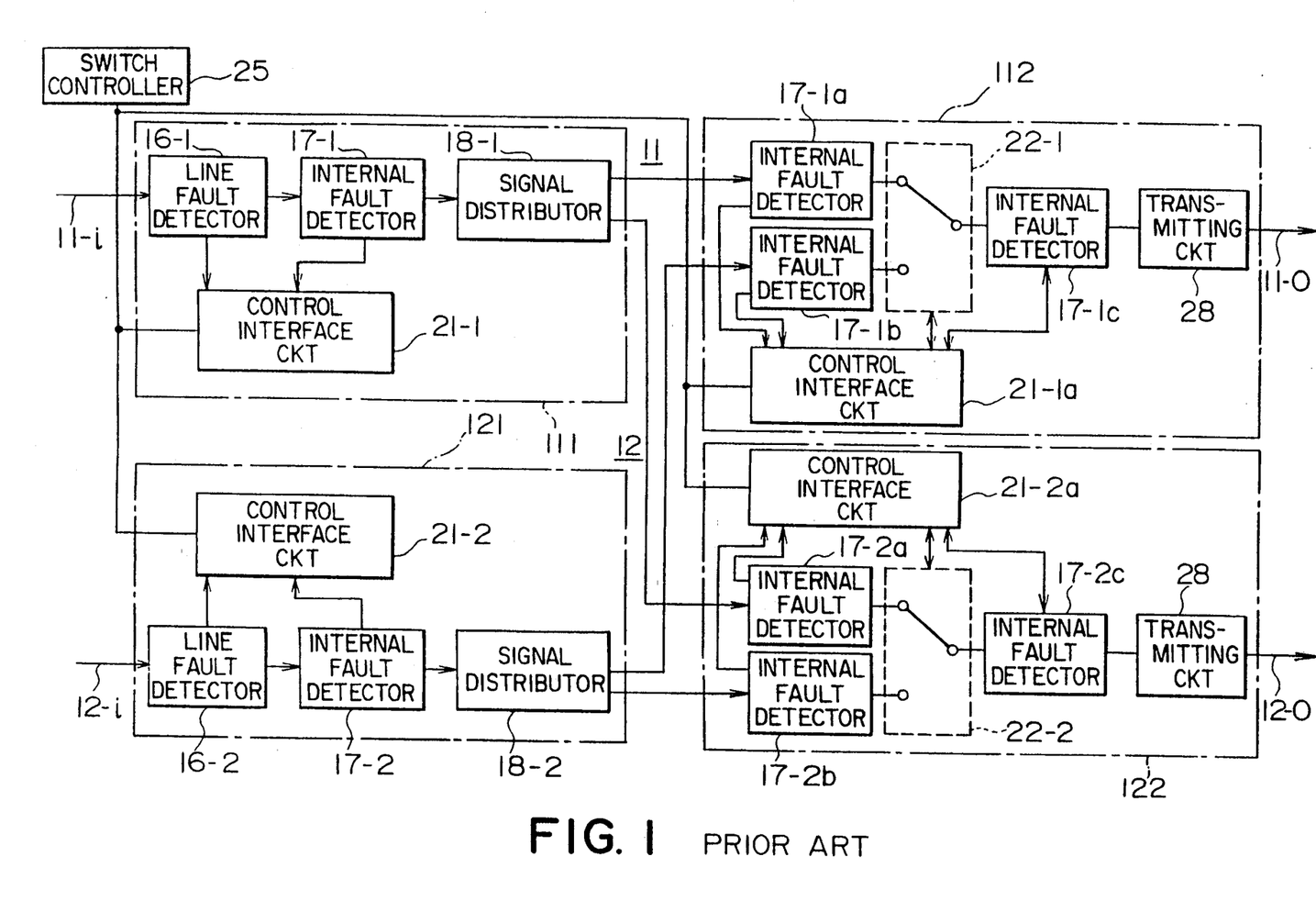
FIG. 1 shows a block diagram of a conventional transmission device.

Referring to FIG. 1, a conventional transmission device is exemplified which comprises first and second sections 11 and 12 which may be called a 0 scheme section and a 1 scheme section, respectively, and which may selectively act as active and backup sections. Without loss of generality, it is assumed in FIG. 1 that the first and the second sections 11 and 12 are operable as an active section and a backup section, respectively, in FIG. 1. The first section 11 is connected between a first input line 11-i and a first output line 11-o while the second section 12 is connected between a second input line 12-i and a second output line 12-o. Both of the first and the second input lines 11-i and 12-i are given an identical signal and may be connected to external transmission paths or internal transmission paths.

The first section 11 comprises a first primary package stage 111 connected to the first input line 11-i and a second primary package stage 112 connected to the first output line 11-o while the second section 12 comprises a first subsidiary package stage 121 connected to the second input line 12-i and a second subsidiary package stage 122 connected to the second output line 12-o.

The first primary and the first subsidiary package stages 111 and 121 are similar in structure and operation to each other while the second primary and the second subsidiary package stages 112 and 122 are also similar in structure and operation to each other.

In FIG. 1, the first primary package stage 111 comprises a line fault detector 16-1 for detecting a fault, such as a signal interruption, a disorder of frame synchronization on the first input line 11-i, and an internal fault detector 17-1 for detection of an internal fault which might occur in the transmission device. Herein, the internal fault detector 17-1 monitors interruption of an internal signal and checks a test pattern located in an idle time slot and a parity bit to detect the internal fault. A first distributor 18-1 is also included in the first primary package stage 111 to distribute signals to both the second primary and the second subsidiary package stages 112 and 122 in parallel. In addition, a control interface circuit 21-1 is included in the first primary package stage 111 and is connected to the line fault detector 16-1 and the internal fault detector 17-1 to collect results of detection from the line fault detector 16-1 and the internal fault detector 17-1. The control interface circuit 21-1 is connected to a switch controller 25 which comprises a central processing unit (CPU) (not shown) and which collects fault information to switch from the active section to the backup section on detection of a fault.

Likewise, the first subsidiary package stage 121 comprises a line fault detector 16-2, and internal fault detector 17-2, a signal distributor 18-2, and a control interface circuit 21-2, all of which are identical with those of the first primary package stage 111, respectively.

On the other hand, the second primary package stage 112 comprises first and second internal fault detectors 17-1a and 17-1b which are connected to the signal distributors 18-1 and 18-2, respectively, and which are operable in a manner similar to the internal fault detector 17-1 or 17-2. Both the first and the second internal fault detectors 17-1a and 17-1b are selected by a switch circuit 22-1 which is connected to a third internal fault detector 17-1c connected to the first output line 11-o. The first through the third internal fault detectors 17-1a to 17-1c and the switch circuit 22-1 are connected to a control interface circuit 21-1a which is similar to the control interface circuit 21-1 of the first primary package stage 111. The control interface circuit 21-1a is controlled by the switch controller 25 like the control interface circuit 21-1.

Similarly, the second subsidiary package stage 122 comprises first through third internal fault detectors 17-2a to 17-2c, a switch circuit 22-2, and a control interface circuit 21-2a all of which are operable in manners similar to those of the second primary package stage 112. Thus, all of the control interface circuits 21-1, 21-2, 21-1a, and 21-2a are controlled by the switch controller 25. In addition, the first primary and the first subsidiary package stages 111 and 121 are connected to the first and the second internal fault detectors 17-1a, 17-1b, 17-2a, and 17-2b of the second primary and the second subsidiary package stages 112 and 122 through electric wirings formed on a back board.

In addition, each of the second primary and the second subsidiary package stages 112 and 122 further comprises a transmitting circuit which inserts an overhead, converts an electric signal into an optical signal, or the like and which is depicted at 28 in FIG. 1.

If a fault is detected in the active section by the switch controller 25, the switch circuits 22-1 and 22-2 are controlled by the control interface circuits 21-1a and 21-2a in the second primary and the second subsidiary package stages 112 and 122 and switched from the active section to the backup section. Thus, the fault in the active section is recovered by the backup section.

With this structure, a pair of the internal fault detectors, such as 17-1a and 17-1b, 17-2a, and 17-2b, should be included in each of the second primary and the second subsidiary package stages 112 and 122. In addition, the switch controller 25 should monitor the control interface circuits 21-1, 21-2, 21-1a, and 21-2a which are included in all of the packages 111, 112, 121, and 122. Accordingly, the illustrated transmission device has shortcomings as mentioned in the preamble of the instant specification.

Figure 2:
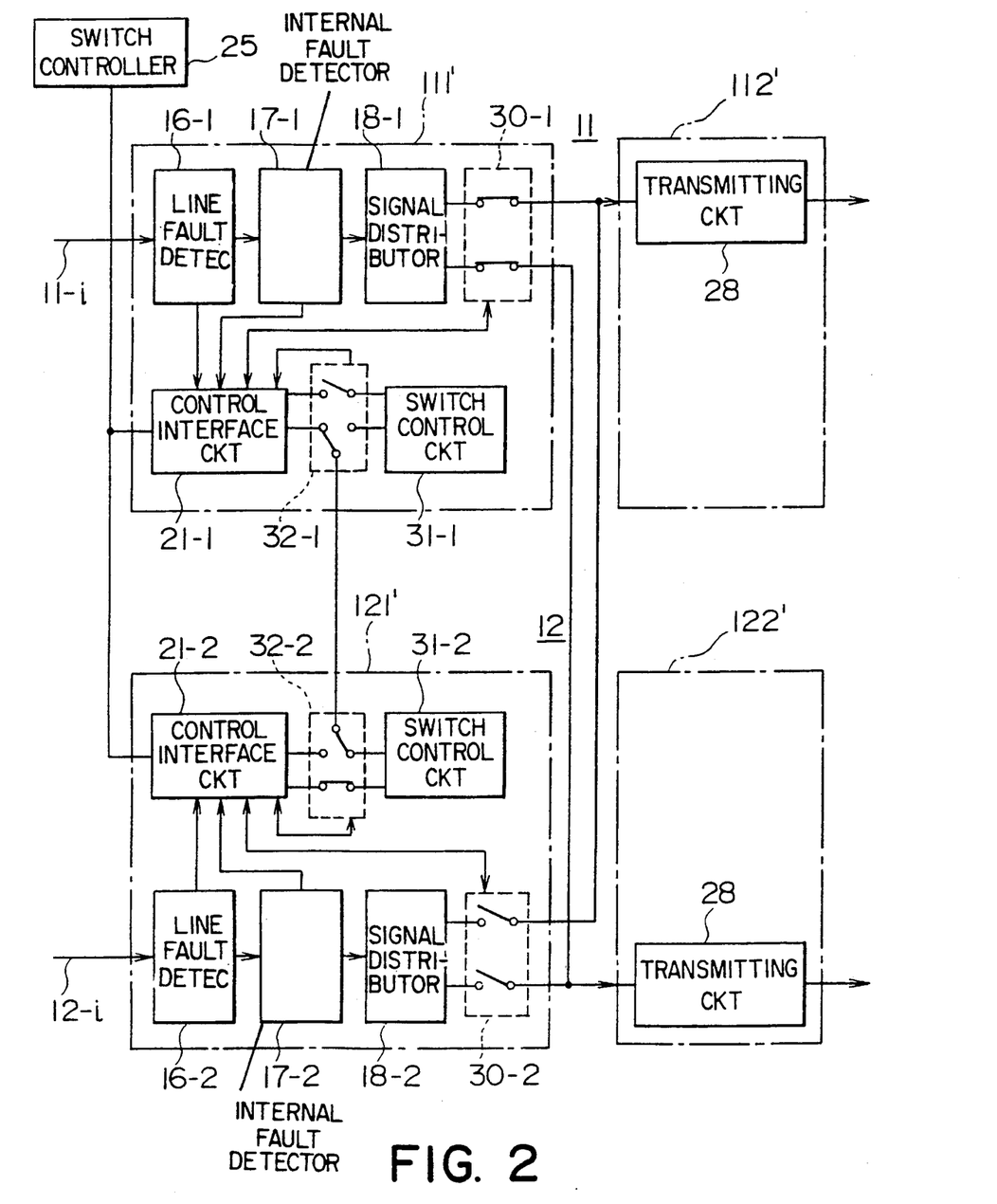
FIG. 2 shows a block diagram of a transmission device according to a first embodiment of this invention.

Referring to FIG. 2, a transmission device according to a first embodiment of this invention comprises similar parts designated by like reference numerals. In the example being illustrated, the transmission device comprises first primary and first subsidiary package stages which are depicted at 111' and 121' and which are included in the first and the second sections 11 and 12, respectively, like in FIG. 1. The first primary and the first subsidiary package stages 111' and 121' are somewhat different from those illustrated in FIG. 1, as will become clear later. Herein, it is to be noted that only the first primary and the first subsidiary package stages 111' and 121' are connected to and controlled by the switch controller 25 and connected to second primary and second subsidiary package stages 112' and 122', as shown in FIG. 2. This means that the second primary and the second subsidiary package stages 112' and 122' are disconnected from the switch controller 25. This shows that no control interface circuit is included in the second primary and the second subsidiary package stages 112' and 122'. In this connection, each of the second primary and the second subsidiary package stages 112' and 122' is specified in FIG. 2 by the transmitting circuit 28 alone.

In addition, the transmitting circuit 28 in each of the second primary and the second subsidiary package stages 112' and 122' is connected to both the first primary package stage 111' and the first subsidiary package stage 121' in common on a back board (not shown). This means that a single input terminal alone may be provided in each of the second primary and the second subsidiary package stages 112' and 122', as illustrated in FIG. 2. Thus, a connection between the first primary and the first subsidiary package stages 111' and 121' and the second primary and the second subsidiary package stages 112' and 122' may be called a connection circuit therebetween.

More specifically, each of the first primary package stage 111' and the first subsidiary package stage 121' is different from each package stage 111 and 121 illustrated in FIG. 1 in that switch circuits 30-1 and 30-2, switch control circuits 31-1 and 31-2, and local switch circuits 32-1 and 32-2 are included in the first primary and the first subsidiary package stages 111' and 121'. In addition, the line fault detector 16, the internal fault detector 17, and the signal distributor 18 (suffixes omitted) are also included in each of the first primary and the first subsidiary package stages 111' and 121', like in FIG. 1. The signal distributors 18-1 and 18-2 are connected to the switch circuits 30-1 and 30-2 which are controlled by the control interface circuits 21-1 and 21-2 in the first primary and the first subsidiary package stages 111' and 112', respectively.

Each of the illustrated control interface circuits 21-1 and 21-2 is connected to each of the internal switch circuits 32-1 and 32-2 selectively connected to the switch control circuits 31-1 and 31-2 in a manner to be described later. The illustrated control interface circuits 21 (suffixes omitted) collect fault information from the line fault detectors 16, the internal fault detectors 17 (suffixes omitted) to detect a fault and switch the internal switch circuits 32 from one to another.

In the example being illustrated, the first primary package stage 111' is put into an active state while the first subsidiary package stage 121' is put into an inactive or standby state. In this connection, the control interface circuits 21-1 of the first primary package stage 111' is connected to the switch control circuit 31-2 of the first subsidiary package stage 121' through the internal switch circuits 32-1 and 32-2, as shown in FIG. 2.

Under the circumstances, the switch control circuit 31-2 of the first subsidiary package stage 121' is connected to both the control interface circuits 21-1 and 21-2 to be supplied with the results of detection in both the control interface circuits 21-1 and 21-2. Thus, the switch control circuit 31-2 of the first subsidiary package stage 121' collects the results of detection and judges whether or not a fault takes place in the first primary and the first subsidiary package stages 111' and 121' and the first and the second input lines 11-i and 12-i.

Furthermore, the control interface circuits 21-1 and 21-2 of the first primary and the first subsidiary package stages 111' and 121' are connected to the switch controller 25 which is operable to initially set up the switch circuits 30-1, 30-2 and the internal switch circuits 32-1, 32-2 and to monitor and record operations of the first primary and the first subsidiary package stages 111' and 121'.

In this transmission device, let a fault be detected by the control interface circuit 21-1 of the first primary package stage 111' and be transmitted to the switch control circuit 31-2 of the first subsidiary package stage 121' through the internal switch circuits 32-1 and 32-2. In this event, the switch control circuit 31-2 delivers a command to the control interface circuits 21-1 and 21-2 to put the switch circuits 30-1 and 30-2 and the internal switch circuits 32-1 and 32-2 into states different from the illustrated states. In this case, the switch circuit 30-1 is opened in the first primary package stage 111' and the switch circuit 30-2 is closed in the first subsidiary package stage 121'. Likewise, the internal switch circuit 32-1 is switched to connect the control interface circuit 21-1 to the switch control circuit 31-1. Simultaneously, the internal switch circuit 32-2 is switched to connect the control interface circuit 21-2 of the first subsidiary package stage 121' to the switch control circuit 31-1 of the first primary package stage 111' with the control interface circuit 21-2 disconnected from the switch control circuit 31-2.

Thus, an input signal which is sent from the second input line 12-i is delivered through the signal distributor 18-2 and the switch circuit 30-2 of the first subsidiary package stage 111' to both the second primary and the second subsidiary package stages 112' and 122'. From this fact, it is readily understood that the active section or the first section 11 is switched to the backup or the second section 12 and that the fault in the first section is recovered by the second section 12.

More specifically, the signal distributor 18-1 which may be called a primary signal distributor distributes the input signal in a normal state and produces a pair of primary input signals each of which is identical with the input signal sent through the first input line 11-i. The switch circuit 30-1 which may be referred to as a first switch circuit has a pair of primary switch input terminals and a pair of primary switch output terminals. The primary input signals are supplied through the primary switch input terminals and are selectively sent through the primary switch output terminals.

The switch circuit 30-2 which may be referred to as a second switch circuit has a pair of subsidiary switch input terminals and a pair of subsidiary switch output terminals and carries out an operation similar to that mentioned above in connection with the switch circuit 30-1.

Figure 3:
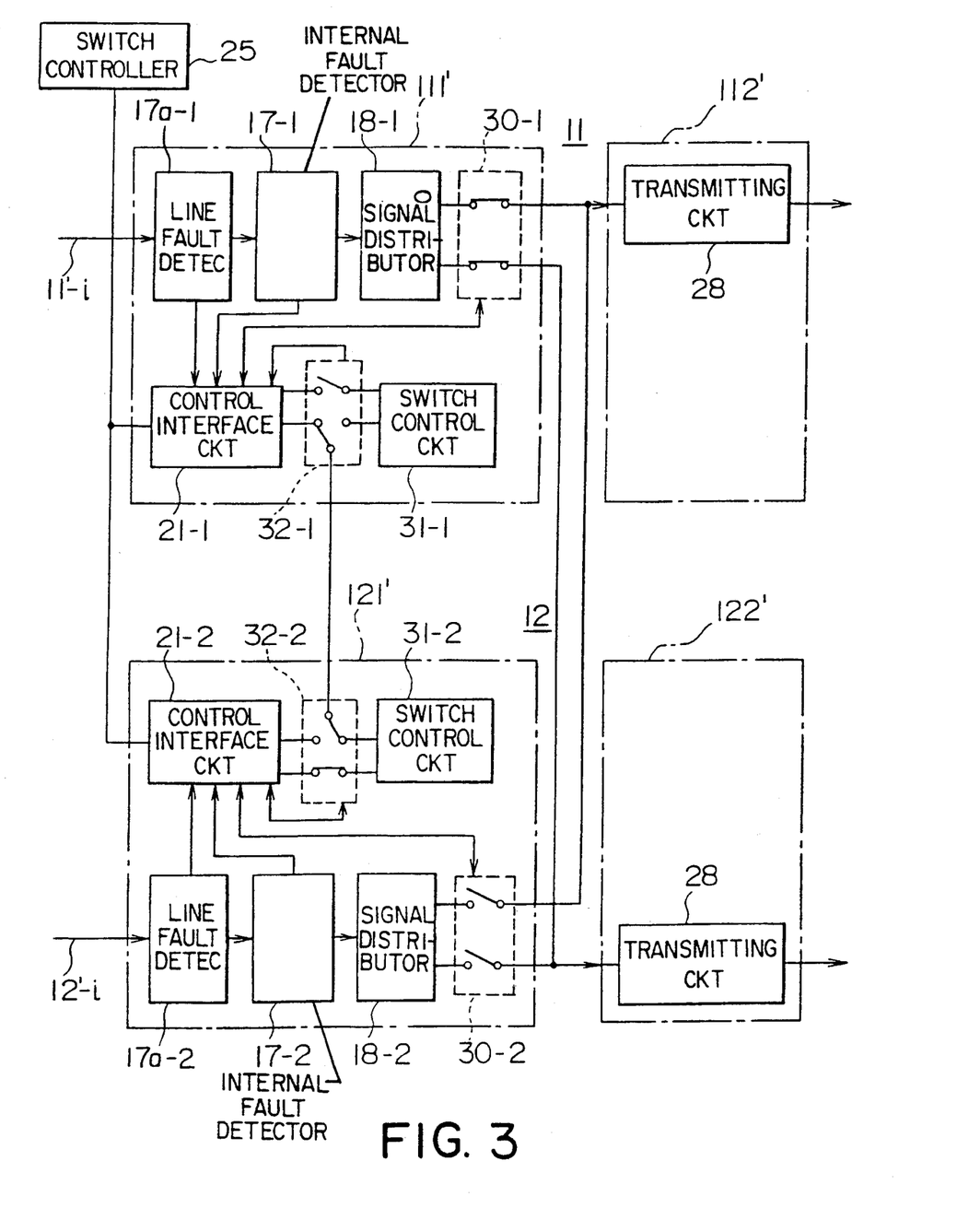
FIG. 3 shows a block diagram of a transmission device according to a second embodiment of this invention.

Referring to FIG. 3, a transmission device according to a second embodiment of this invention comprises similar parts designated by like reference numerals and symbols. The illustrated transmission device is connected to first and second internal signal lines which are depicted at 11'-i and 12'-i, respectively, and which are interconnected to any other circuit units of a system. This shows that the transmission device and the other circuit units belong to the common system. Like in FIG. 2, the transmission device illustrated in FIG. 3 comprises the first and the second sections 11 and 12. The first section 11 comprises the first primary package stage 111' and the second primary package stage 112' while the second section 12 comprises the first subsidiary package stage 121' and the second subsidiary package stage 122'. The second primary and the second subsidiary package stages 112' and 122' are similar in structure and operation to those illustrated in FIG. 2, respectively.

However, it is to be noted in FIG. 3 that each of the first primary package stage 111' and the first subsidiary package stage 121' comprises a fault detector 17a-1, 17a-2 which is arranged instead of the line fault detector 16-1, 16-2 shown in FIG. 2 and which is similar in structure to the internal fault detector 17-1, 17-2. Each of the illustrated fault detectors 17a-1 and 17a-2 is operable to detect a fault in the other circuit units connected to thereto, which differs from the line fault detectors 16-1 and 16-2 of FIG. 2 which detects a fault on the lines 11-i and 12-i.

As mentioned in conjunction with FIG. 2, the transmitting circuit 28 of the second primary package stage 112' is connected to both the switch circuits 30-1 and 30-2 included in the first primary and the first subsidiary package stages 111' and 121' through a back board. Likewise, the transmitting circuit 28 of the second subsidiary package stage 122' is connected to both the switch circuits 30-1 and 30-2. In other words, each internal or outgoing output line of the first primary package stage 111' is connected in common to each internal output line of the first subsidiary package stage 121' on the back board. Accordingly, each of the second primary and the second subsidiary package stages 112' and 122' may have a single input terminal.

At any rate, the first and the second internal signal lines 11'-i and 12'-i are supplied with the same input signals from the other circuit units.

Inasmuch as the switch circuit 30-1 is closed in the first primary package stage 111' while the switch circuit 30-2 is opened in the first subsidiary package unit 121' in the illustrated example, the first section 11 is operable as an active section while the second section 12 is operable as a backup or standby section. In this connection, the input signal which is received through the first internal line 11'-i is delivered through the switch circuit 30-1 of the first primary package stage 111' to both the second primary and the second subsidiary package stages 112' and 122' in a normal state.

In each of the first primary and the first subsidiary package stages 111' and 121', the internal fault detectors 17a and 17 (suffixes omitted), the switch circuit 30, and the internal switch circuit 32 are monitored and controlled by the control interface circuit 21, the switch control circuit 31, and the switch controller 25 in the manner described with reference to FIG. 2.

Under the circumstances, when a fault is detected in the normal state by the switch control circuit 31-1, a switching command is delivered from the switch control circuit 31-1 to both the control interface circuits 21-1 and 21-2. Supplied with the switching command, the control interface circuits 21-1 and 21-2 control the switch circuits 30-1, 30-2 and the internal switch circuits 32-1 and 32-2 to switch them from the illustrated states to the other states. Thus, the input signal is delivered through the switch circuit 30-2 of the first subsidiary package stage 121' to both the second primary and the second subsidiary package stages 112' and 122'. In this manner, the fault in the first section 11 is recovered by the second section 12.

Figure 4:
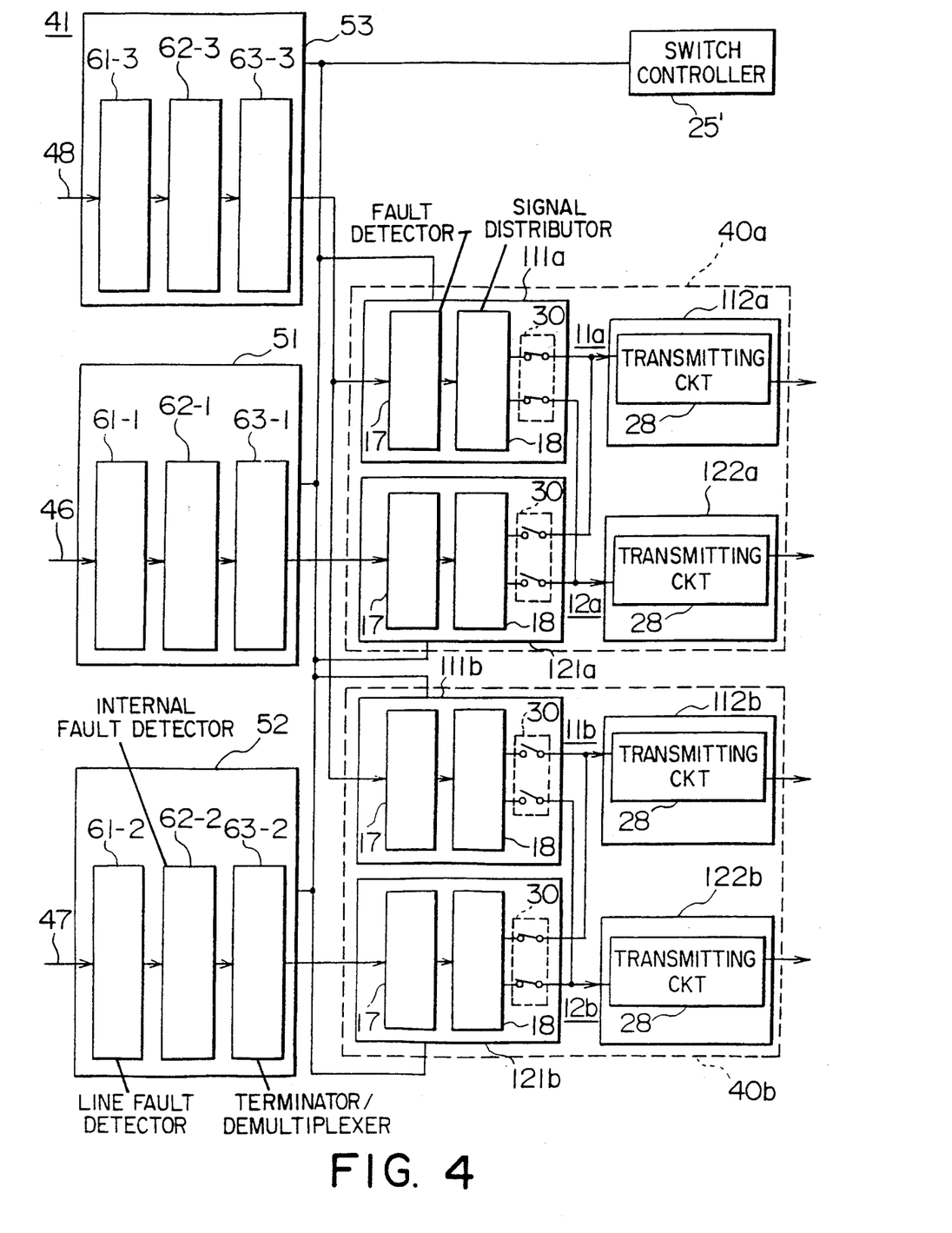
FIG. 4 shows a block diagram of a transmission device according to a third embodiment of this invention.

Referring to FIG. 4, a transmission system according to a third embodiment of this invention comprises a pair of transmission devices each of which is similar in structure to that illustrated in FIG. 2 and which are represented by 40a and 40b. The illustrated transmission devices 40a and 40b may be referred to as first and second transmission devices, respectively, and are combined with a high speed system 41 to form the transmission system which may be operable as a multiplexing-/demultiplexing system, although a multiplexer is not shown in FIG. 4. In this connection, a combination of the transmission devices 40a and 40b may be referred to as a low speed system.

As illustrated in FIG. 4, the first transmission device 40a comprises first primary and first subsidiary package stages depicted at 111a and 121a and second primary and second subsidiary package stages depicted at 112a and 122a. A combination of the first primary package stage 111a and the second primary package stage 112a forms a first section 11a of the first transmission device 40a while a combination of the first subsidiary package stage 121a and the second subsidiary package stage 122a forms a second section 12a. The first primary and the first subsidiary package stages 111a and 121a and the second primary and the second subsidiary package stages 112a and 122a are connected to one another in the manner mentioned in conjunction with FIGS. 2 and 3.

Likewise, the second transmission device 40b comprises first primary and first subsidiary package stages depicted at 111b and 121b and second primary and second subsidiary package stages 112b and 122b. In the second transmission device 40b, a combination of the first primary and the second primary package stages 111b and 112b forms a first section 11b of the second transmission device 40b while a combination of the first subsidiary and the second subsidiary package stages 121b and 122b forms a second section 12b. Connections among the package stages 111b, 112b, 121b, and 122b are identical with those illustrated in the first transmission device 40a.

Each of the first primary and the first subsidiary package stages 111a, 121a, 111b, and 121b is specified by a fault detector 17, a signal distributor 18, and a switch circuit 30 with the internal switch circuit, the control interface circuit, and the switch control circuit of FIGS. 2 and 3 omitted from FIG. 4 for simplification of the drawing. The first primary package stages 111a, 111b, and the first subsidiary package stages 121a, 121b are all connected to a switch controller 25' which is operable in a manner similar to the switch controller 25 illustrated in FIGS. 2 and 3. Therefore, the switch controller 25' collects and records fault information of the package stages 111a, 111b, 121a, and 121b to initially set up initial states in the respective package stages 111a, 111b, 121a, and 121b, as mentioned before.

In the illustrated example, the switch circuits 30 of both the first primary package stage 111a and the first subsidiary package stage 121b are closed in the first and the second transmission devices 40a and 40b, respectively, while the switch circuits 30 of both the first subsidiary package stage 121a and the first primary package stage 111b are opened in the first and the second transmission devices 40a and 40b, respectively.

This means that the first sections 11a and 11b of the first and the second transmission devices 40a and 40b are selectively or alternatingly put into an active state and may be collectively called a 0 scheme package group while the second sections 12a and 12b of the first and the second transmission devices 40a and 40b are also alternatingly operated and may be referred to as a 1 scheme package group.

In FIG. 4, the high speed system 41 is connected to two high speed active transmission lines 46 and 47 and a single backup high speed transmission line 48. The high speed active transmission lines 46 and 47 may be called first and second active high speed transmission lines, respectively.

The illustrated high speed system 41 comprises first and second active high speed package stages 51 and 52 connected to the first and the second active high speed transmission lines 46 and 47 and a single backup high speed package stage 53 connected to the backup high speed transmission line 48. The first and the second active high speed package stages 51 and 52 and the backup high speed package stage 53 are also connected to the switch controller 25' to collect fault information from the high speed package stages 51 to 53.

In general, an active-to-backup ratio may be generally represented by N:1. From this fact, it is readily understood that the high speed system 41 illustrated in FIG. 4 has a redundant structure of the active-to-backup ratio of 2:1.

Each of the first and the second active high speed package stages 51 and 52 and the backup high speed package stage 53 is similar in structure and operation to one another. Accordingly, description will be mainly directed to the first active high speed package stage 51 which comprises elements specified by a suffix 1. Now, the first active high speed package stage 51 comprises a line fault detector 61-1, a signal terminator/demultiplexer 62-1, and an internal fault detector 63-1. The line fault detector 61-1 acts to detect a fault on the backup high speed transmission line 48 while the signal terminator/demultiplexer 62-1 serves to receive a multiplexed input signal sent through the first active high speed transmission line 46 and to demultiplex the multiplexed input signal into demultiplexed signals in parallel. A selected one of the demultiplexed signals is supplied to the internal fault detector 63-1 illustrated in FIG. 4. Likewise, each of the second active high speed package stage 52 and the backup high speed package stage 53 comprises a line fault detector 61, a signal terminator/demultiplexer 62, and an internal fault detector 63, with suffixes 2 and 3 attached thereto to specify the second and the backup high speed package stages 52 and 53.

Each line fault detector 61 of the first and the second active high speed package stages 51 and 52 and the backup high speed package stage 53 detects a fault on each of the high speed transmission lines 46 to 48. Such a fault may be, for example, interruption of a signal, a disorder of frame synchronization. On the other hand, the internal fault detector 63 detects an internal fault which might occur in each of the high speed package stages 51 to 53. When a fault is detected in each of the line fault detectors 61 and the internal fault detectors 63, a signal is reproduced in each detector 61 and 63 so as to prevent such a fault from being spread downstream. This is true of the other fault detectors included in the first and the second transmission devices 40a and 40b.

In addition, the internal fault detector 63-3 of the backup high speed package stage 53 is connected to both the first primary package stages 111a and 111b of the first and the second transmission devices 40a and 40b. In FIG. 4, the internal fault detector 63-1 of the first active high speed package stage 51 is connected to the first subsidiary package stage 121a of the first transmission device 40a while the internal fault detector 63-2 of the second active high speed package stage 52 is connected to the first subsidiary package stage 121b of the second transmission device 40b.

In the illustrated example, the switch circuits 30 of the first primary package stages 111a and 111b in the first and the second transmission devices 40a and 40b are connected to the backup high speed package with only the switch circuit 30 of the first transmission device 40a closed, as mentioned before. Furthermore, the first active high speed package stage 51 is disconnected from the second primary and the second subsidiary package stages 112a and 122a because the switch circuit 30 is opened in the first subsidiary package stage 121a of the first transmission device 40a. On the other hand, the second active high speed package stage 52 is connected to the second primary and the second subsidiary package stages 112b and 122b through the switch circuit 30 of the first subsidiary package stage 121b.

From this fact, it is readily understood as regards the illustrated example that a fault takes place in the first active high speed package stage 51 and is recovered by the backup high speed package stage 53. In other words, the first transmission device 40a selects the backup high speed package stage 53 while the second transmission device 40b selects the second active high speed package stage 52.

With this structure, the switch controller 25' may monitor only the first primary and the first subsidiary package stages 111a, 121a, 111b, and 112b together with the first and the second active high speed package stages 51 and 52 and the backup high speed package stage 53. This means that neither control operation nor detecting operation is necessary about the second primary and the second subsidiary package stages 112a, 122a, 112b, and 122b. Accordingly, control operation is very simplified in the switch controller 25'. Moreover, outgoing lines of a selected one of the first primary and the first subsidiary package stages 111a and 121a or 111b and 121b are connected in common to those of another package stage of the first primary and the first subsidiary package stages 111a and 121a or 111b and 121b on the back board. This enables simplification of wirings arranged on the back board.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A transmission device located between first and second input lines for first and second input signals, respectively, and first and second output lines for first and second output signals, respectively, said transmission device comprising first and second sections which are selectively operable as an active section and a backup section, said first section comprising a first primary package stage connected to said first input line and a second primary package stage connected to said first output line while said second section comprises a first subsidiary package stage connected to said second input line and a second subsidiary package stage connected to said second output line, (A) said first primary package stage comprising:
   (a) a primary signal distributing circuit connected to said first input line for distributing said first input signal so as to produce first and second primary input signals each of which is identical with said first input signal; and
   (b) a first switch circuit which has first and second primary switch input terminals and first and second primary switch output terminals and which is supplied through said first and second primary switch input terminals with said first and second primary input signals, respectively, for selectively sending said first and second primary input signals to said first and second primary switch output terminals, respectively;

(B) said first subsidiary package stage comprising:
   (a) a subsidiary signal distributing circuit connected to said second input line for distributing said second input signal so as to produce first and second subsidiary input signals each of which is identical with said second input signal; and
   (b) a second switch circuit which has first and second subsidiary switch input terminals and first and second subsidiary switch output terminals and which is supplied through said first and second subsidiary switch input terminals with said first and second subsidiary input signals, respectively, for selectively sending said first and second subsidiary input signals to said first and second subsidiary switch output terminals, respectively;

(C) said transmission device further comprising:
   connection means between said first primary and said first subsidiary package stages and between said second primary and said second subsidiary package stages for connecting said first primary switch output terminal and said first subsidiary switch output terminal to the second primary package stage in common, and for connecting said second primary switch output terminal and said second subsidiary switch output terminal to the second subsidiary package stage in common;

(D) said second primary package stage comprising:
   a transmitting circuit connected by said connection means to both said first primary and said first subsidiary switch output terminals for transmitting the first primary input and the first subsidiary input signals, selectively sent through the first and the second switch circuits, to said first output line; and (E) said second subsidiary package stage comprising:
   a transmitting circuit connected by said connection means to both said second primary and said second subsidiary switch output terminals for transmitting the second primary input and the second subsidiary input signals, selectively sent through the first and the second switch circuits, to said second output line, wherein each of said first primary and said first subsidiary package stages further comprises:
   a fault detector for detecting a fault in each of said first primary and said first subsidiary package stages; and
   control means coupled to each of said first and said second switch circuits and said fault detector for controlling each of said first and said second switch circuits to selectively send a selected set of said primary and said subsidiary input signals to a selected set of said primary and said subsidiary switch output terminals when said fault is detected by said fault detector.

2. A transmission device as claimed in claim 1, further comprising:
   monitoring means coupled to said control means of said first primary and said first subsidiary package stages for monitoring said control means of the first primary and the first subsidiary package stages to record the fault detected by said fault detectors of the first primary and the first subsidiary package stages.

3. A transmission system comprising first and second transmission devices each of which is located between first and second input lines for first and second input signals, respectively, and first and second output lines for first and second output signals, respectively, said each transmission device comprising first and second sections which are selectively operable as an active section and a backup section, said first section comprising a first primary package stage connected to said first input line and a second primary package stage connected to said first output line while said second section comprises a first subsidiary package stage connected to said second input line and a second subsidiary package stage connected to said second output line, (A) said first primary package stage comprising:
   (a) a primary signal distributing circuit connected to said first input line for distributing said first input signal so as to produce first and second primary input signals each of which is identical with said first input signal; and
   (b) a first switch circuit which has first and second primary switch input terminals and first and second primary switch output terminals and which is supplied through said first and second primary switch input terminals with said first and second primary input signals, respectively, for selectively sending said first and second primary input signals to said first and second primary switch output terminals, respectively;

(B) said first subsidiary package stage comprising:
(a) a subsidiary signal distributing circuit connected to said second input line for distributing said second input signal so as to produce first and second subsidiary input signals each of which is identical with said second input signal; and
(b) a second switch circuit which has first and second subsidiary switch input terminals and first and second subsidiary switch output terminals and which is supplied through said first and second subsidiary switch input terminals with said first and second subsidiary input signals, respectively, for selectively sending said first and second subsidiary input signals to said first and second subsidiary switch output terminals, respectively;

(C) said each transmission device further comprising:
connection means between said first primary and said first subsidiary package stages and between said second primary and said second subsidiary package stages for connecting said first primary switch output terminal and said first subsidiary switch output terminal to the second primary package stage in common, and for connecting said second primary switch output terminal and said second subsidiary switch output terminal to the second subsidiary package stage in common;

(D) said second primary package stage comprising:
a transmitting circuit connected by said connection means to both said first primary and said first subsidiary switch output terminals for transmitting the first primary input and the first subsidiary input signals, selectively sent through the first and the second switch circuits, to said first output line; and (E) said second subsidiary package stage comprising:
a transmitting circuit connected by said connection means to both said second primary and said second subsidiary switch output terminals for transmitting the second primary input and the second subsidiary input signals, selectively sent through the first and the second switch circuits, to said second output line, said transmission system further comprising:
a first preceding active package stage, connected to the first subsidiary package stage of the first transmission device through the second input line for said first transmission device, for preliminarily processing a first system input signal into the second input signal of the first transmission device;
a second preceding active package stage, connected to the first subsidiary package stage of the second transmission device through the second input line for said second transmission device, for preliminarily processing a second system input signal identical with said first system input signal into the second input signal of the second transmission device; and
a preceding backup package stage, connected to the first primary package stages of the first and the second transmission devices through the first input lines for the first and the second transmission devices, respectively, for preliminarily processing a third system input signal identical with said second system input signal into the first input signal of the first and the second transmission devices, respectively;
said first and said second preceding active package stages and the preceding backup package stage being identical with one another in structure.

* * * * *